United States Patent
Pratt et al.

(10) Patent No.: US 10,298,276 B2
(45) Date of Patent: May 21, 2019

(54) SPATIAL DIGITAL PRE-DISTORTION

(71) Applicant: Analog Devices Global, Hamilton (BM)

(72) Inventors: Patrick Pratt, Mallow (IE); Michael O'Brien, Munster (IE)

(73) Assignee: Analog Devices Global, Hamilton (BM)

( * ) Notice: Subject to any disclaimer, the term of this patent is extended or adjusted under 35 U.S.C. 154(b) by 0 days.

(21) Appl. No.: 15/372,723

(22) Filed: Dec. 8, 2016

(65) Prior Publication Data

US 2018/0167091 A1 Jun. 14, 2018

(51) Int. Cl.
*H04B 1/04* (2006.01)
*H04B 7/06* (2006.01)

(52) U.S. Cl.
CPC ......... *H04B 1/0475* (2013.01); *H04B 1/0483* (2013.01); *H04B 7/0617* (2013.01);
(Continued)

(58) Field of Classification Search
CPC .......... H04B 2001/0441; H04B 1/0475; H04B 2001/0425; H04B 7/0617;
(Continued)

(56) References Cited

U.S. PATENT DOCUMENTS 7,280,848 B2  10/2007  Hoppenstein
8,457,026 B1 *  6/2013  Ho ..................... H04B 7/0617
                                                                 342/359

(Continued)

FOREIGN PATENT DOCUMENTS

EP          3267579 A1   10/2018
WO   WO-2017091119 A1    6/2017

OTHER PUBLICATIONS

Lee et al. "Digital Predistortion for Power Amplifiers in Hybrid MIMO Systems with Antenna Subarrays" IEEE, Jul. 2015, pp. 1-5.*
(Continued)

*Primary Examiner* — Sophia Vlahos
(74) *Attorney, Agent, or Firm* — Schwegman Lundberg & Woessner, P.A.

(57) ABSTRACT

Power amplifier circuits can behave in a non-linear manner particularly when operated to produce output signal swings approaching an amplifier saturation region. A pre-distortion signal can be applied to a signal to be transmitted to compensate for such power amplifier non-linearity. In applications where two or more transmitter power amplifiers are used, a beam-former can be configured to modify a digitally pre-distorted transmission signal by applying respective beam-forming weighting factors to the digitally pre-distorted transmission signal to provide input transmission signals for respective ones of the power amplifier circuits. The pre-distortion signal can be established at least in part using one or more of a sensed or estimated representation of a transmitted beam formed by spatially aggregating transmitted outputs from the two or more power amplifier circuits. In this manner, power amplifier efficiency can be enhanced without entirely separate pre-distortion compensation for each of the power amplifier circuits.

28 Claims, 5 Drawing Sheets

(52) U.S. Cl.
CPC .............. *H04B 2001/0425* (2013.01); *H04B 2001/0433* (2013.01); *H04B 2001/0441* (2013.01); *Y02D 70/40* (2018.01); *Y02D 70/444* (2018.01)

(58) Field of Classification Search
CPC .......... H04B 2001/0433; H04B 1/0483; H04L 27/368; Y02D 70/444; Y02D 70/40
See application file for complete search history.

(56) References Cited

U.S. PATENT DOCUMENTS

| | | |
|---|---|---|
| 8,489,041 B2 | 7/2013 | Teillet et al. |
| 9,948,490 B2 * | 4/2018 | Eitan .................... H04L 27/367 |
| 2007/0153884 A1 * | 7/2007 | Balasubramanian ........................ H03F 1/3247 375/221 |
| 2010/0166109 A1 * | 7/2010 | Neumann ............. H03F 1/3247 375/296 |
| 2013/0163696 A1 * | 6/2013 | Son ....................... H03F 1/3241 375/297 |
| 2015/0012786 A1 * | 1/2015 | Varadarajan ......... G11C 29/789 714/718 |
| 2015/0103952 A1 | 4/2015 | Wang et al. |
| 2015/0332704 A1 * | 11/2015 | Sun ....................... H04M 9/082 704/227 |
| 2016/0212677 A1 * | 7/2016 | Chakraborty ......... H04W 40/02 |
| 2017/0279470 A1 * | 9/2017 | Lee ........................... H04B 1/04 |

OTHER PUBLICATIONS

Choi et al. "Digital Predistortion Based on Combined Feedback in MIMO Transmitters", IEEE, Aug. 2012, pp. 1572-1575.*
"European Application Serial No. 17/206014.7 search report dated Apr. 17, 2018", 10 pgs.

* cited by examiner

SPATIAL DIGITAL PRE-DISTORTION

FIELD OF THE DISCLOSURE

This document pertains generally, but not by way of limitation, to pre-distortion techniques and systems, and more particularly to digital pre-distortion for systems having multiple power amplifier circuits.

BACKGROUND

Power amplifier circuits can behave in a non-linear manner particularly when operated to produce output signal swings approaching an amplifier saturation region. A pre-distortion signal can be applied to a signal to be transmitted to compensate for such power amplifier non-linearity. Generally, a pre-distortion signal can be generated and applied digitally, such as corresponding to a specific power amplifier, to compensate for a non-linearity of the specific power amplifier. A resulting pre-distorted transmission signal can then be converted to the analog domain and provided to an input of a power amplifier circuit.

SUMMARY OF THE DISCLOSURE

In applications where two or more transmitter power amplifiers are used, a beam-former can be configured to modify a commonly-shared digitally pre-distorted transmission signal by applying respective beam-forming weighting factors to the digitally pre-distorted transmission signal to provide input transmission signals for respective ones of the power amplifier circuits. The pre-distortion signal used to produce the digitally-pre-distorted transmission signal can be established at least in part using one or more of a sensed or estimated representation of a transmitted beam formed by spatially aggregating transmitted outputs from the two or more power amplifier circuits. In this manner, power amplifier efficiency can be enhanced without requiring entirely separate pre-distortion compensation for each of the power amplifier circuits.

In an example, a technique such as a method for compensating for power amplifier circuit non-linearity in a beam-forming communication transmitter having two or more power amplifier circuits can include digitally applying a non-linear pre-distortion signal to a signal to be transmitted to provide a digitally pre-distorted transmission signal, and applying respective beam-forming weighting factors to the digitally pre-distorted transmission signal to provide input transmission signals for respective ones of the two or more power amplifier circuits, the beam-forming weighting factors corresponding to respective ones of the two or more power amplifier circuits. The pre-distortion signal can be established at least in part using one or more of a sensed or estimated representation of a transmitted beam formed by spatially aggregating transmitted outputs from the two or more power amplifier circuits.

In an example, a communication circuit for compensating for power amplifier circuit non-linearity in a beam-forming communication transmitter having two or more power amplifier circuits, the communication circuit comprising a digital pre-distortion circuit configured to digitally apply a non-linear pre-distortion signal to the signal to be transmitted to provide a digitally pre-distorted transmission signal and a beam-former circuit configured to modify the digitally pre-distorted transmission signal by applying respective beam-forming weighting factors to the digitally pre-distorted transmission signal to provide input transmission signals for respective ones of the two or more power amplifier circuits, the beam-forming weighting factors corresponding to respective ones of the two or more power amplifier circuits. As in the example above, the pre-distortion signal can be established at least in part using one or more of a sensed or estimated representation of a transmitted beam formed by spatially aggregating transmitted outputs from the two or more power amplifier circuits.

This summary is intended to provide an overview of subject matter of the present patent application. It is not intended to provide an exclusive or exhaustive explanation of the invention. The detailed description is included to provide further information about the present patent application.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

A digital pre-distortion (DPD) technique can include digitally-synthesizing DPD signals and converting such signals from the digital domain to the analog domain for each power amplifier included in a system, to linearize a response of each power amplifier. In systems only having a modest number of power amplifiers, an approach can be used where respective individual pre-distortion signals are individually digitally generated and applied to an input signal for each power amplifier channel. In such an approach, the pre-distortion signals can be generated and adaptively adjusted on an individualized basis for each power amplifier circuit. However, such an approach may not be viable in applications such as multi-input multi-output (MIMO) systems having a large number of power amplifiers corresponding to a large count of antennas included in a MIMO array.

Wireless communication and networking technologies can incorporate so-called "massive" MIMO architectures, such as having hundreds or thousands of antenna elements. The present inventor has recognized that the one-to-one pre-distortion approach mentioned above may not be easily scalable to such a high-channel-count architecture. In particular, a problem exists using generally-available linearization techniques where a multiplicity of power amplifier circuits are not able to be contemporaneously linearized by a single digital pre-distortion block. This occurs in part because the shared digital pre-distortion may not adequately compensate respective individual power amplifier circuits due to variation in non-linearity characteristics between the respective power amplifier circuits. An individualized approach would involve a dedicated DPD circuit plus a digital-to-analog converter (DAC) circuit for each power amplifier circuit. For large channel counts, such dedicated DPD plus DAC circuitry for each power amplifier becomes prohibitive from an energy consumption and cost standpoint.

Accordingly, the present inventor has recognized that a modified or "hybrid" approach can be used. In a hybrid approach, an antenna architecture can include an analog-domain phased array or other multi-element array topology driven by analog signals. A digital pre-distortion scheme can still be applied, such as by using a commonly-shared digitally pre-distorted transmission signal and providing the commonly-shared transmission signal to multiple power amplifier circuits. Respective ones of the power amplifier circuits can be fed by modified analog input signals having corresponding applied beam-weighting factors, according to an example. The circuitry comprising the digital pre-distortion circuit (and optionally, adaptation and feedback circuitry) can be shared amongst multiple power amplifier circuits. In this manner, an output from the power amplifier circuits to the antenna array can be collectively linearized such as in the spatial domain by using a commonly-shared digital pre-distortion circuit, and a corresponding DAC arrangement. This avoids the problem where the commonly-shared pre-distortion signal does not adequately compensate individual power amplifier circuits. Such linearization can be accomplished adaptively, using one or more of an estimator or feedback representative a transmitted beam formed by spatially aggregating transmitted outputs from the power amplifier circuits, such as a beam transmitted by the antenna array. By spatially aggregating the outputs of an array of power amplifier circuits, a group of such circuits can be collectively linearized using as few as a single spatially-aggregated feedback signal.

Figure 1:
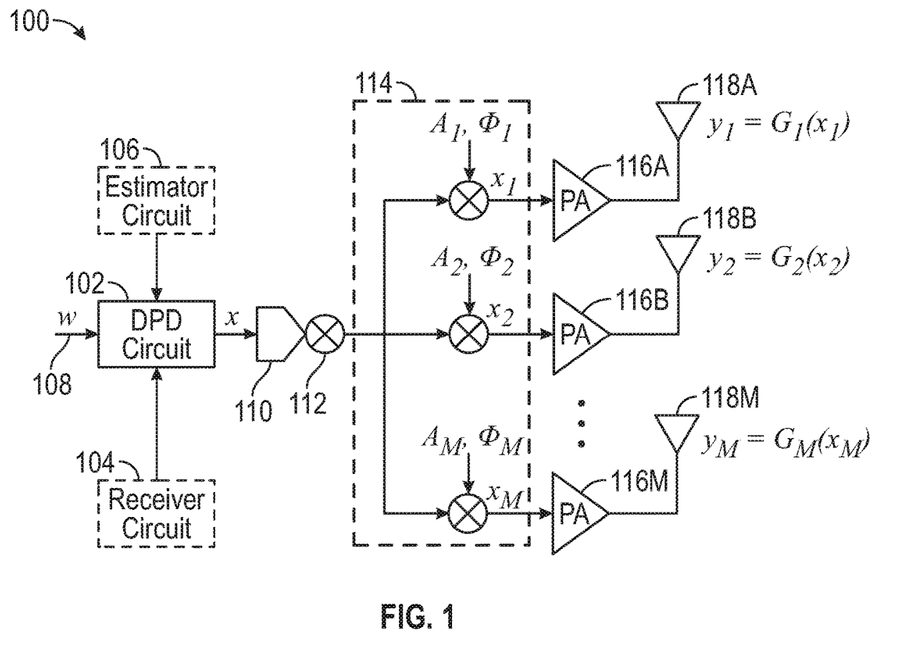
FIG. 1 illustrates generally at least a portion of an electronic system, such as including at least one of a receiver circuit or an estimator circuit, and a digital pre-distortion (DPD) circuit, the DPD circuit providing an output coupleable to one or more power amplifier circuits.

FIG. 1 illustrates generally at least a portion of an electronic system 100, such as including at least one of a receiver circuit 104 or an estimator circuit 106, and a digital pre-distortion (DPD) circuit 102, the DPD circuit 102 providing an output, represented by "x," coupleable to one or more power amplifier (PA) circuits 116A, 116B, through 116M. The PA circuits 116A, 116B, through 116M can be coupled to respective antennas 118A, 118B, through 118M. The antennas 118A through 118M can form an array, such as a full array or sub-array forming a portion of a full array. Generally, each PA circuit exhibits a different non-linear behavior, and such non-linear behavior can result in an output signal from a respective antenna represented as $y_m = G_m(x_m)$. For example, an output from the first antenna 118A from the first PA circuit 116A can be represented as $y_1 = g_1(x_1)$, and the output from the second antenna 118B from the second PA circuit 116B can be represented as $y_2 = g_2(x_2)$. A beam forming circuit 114 can apply respective beam-forming weighting factors Am,φm to the output of the DPD circuit, "x," such as in the analog domain. An input to the beam-forming circuit can include an analog representation of the DPD circuit output signal, "x," such as converted to an analog signal by an digital-to-analog (DAC) converter 110, and up-converted using a mixer circuit 112 coupled to a local oscillator or reference frequency.

As mentioned above, in the unusual circumstance where the PA circuits 116A, 116B, through 116M have similar non-linear responses and similar weighting gains ($A_1, A_2, \ldots, A_m$) are used, a single DPD circuit output "x" could be used to linearize the PA circuit 116A, 116B through 116M without requiring a feedback or adaptive correction signal based on spatial aggregation. The present inventor has recognized that more generally, even poorly-matched PA circuits 116A, 116B, through 116M can be collectively linearized such as by using an estimated or sensed representation of a spatially-aggregated output signal from the array of antennas 18A, 188B, through 118M. As described respectively in FIG. 2A and FIG. 2B below, the sensed representation can be provided by a receiver circuit 104 and the estimated representation can be provided by the estimator circuit 106.

Figure 2A:
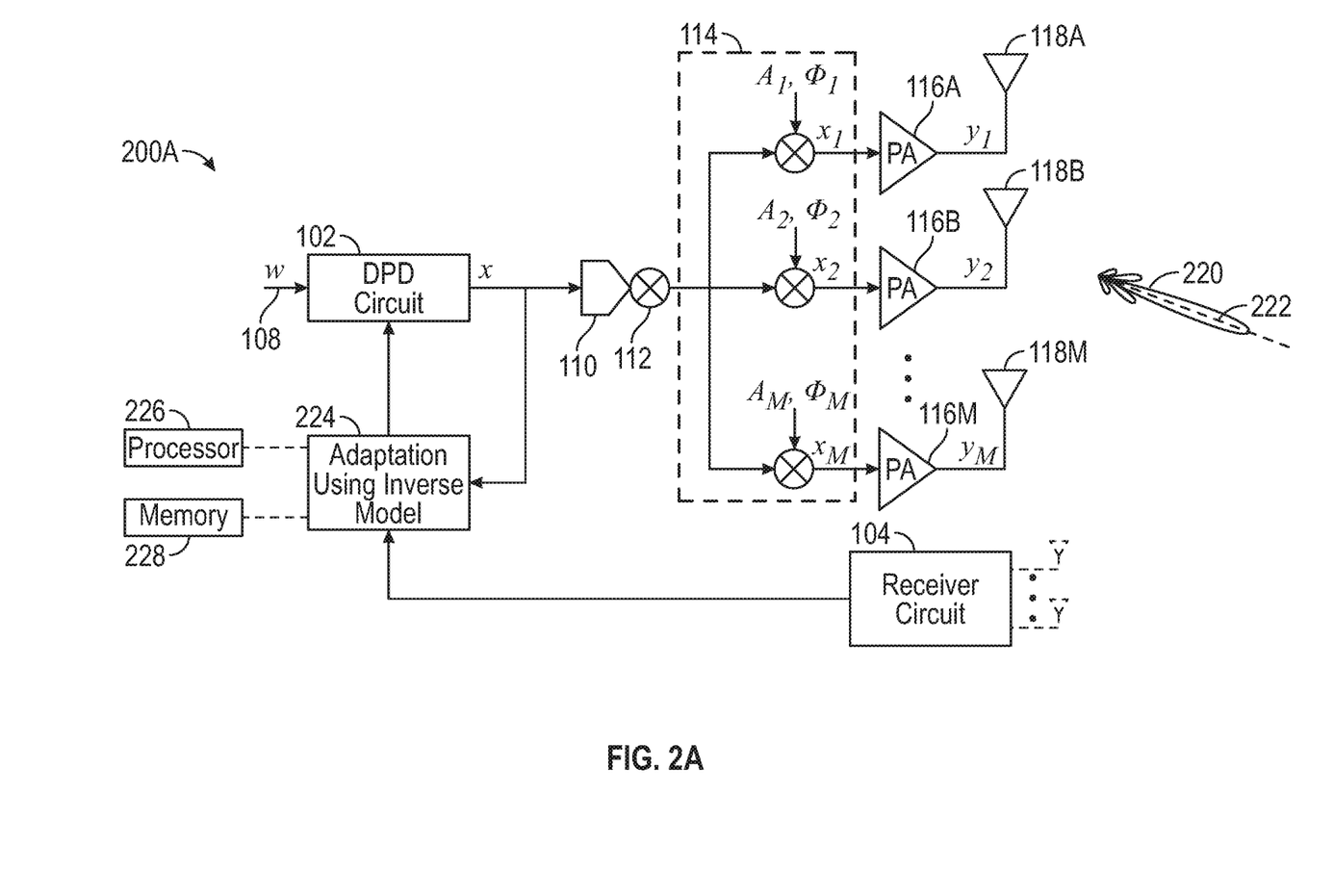
FIG. 2A illustrates generally at least a portion of an electronic system, such as including a receiver circuit, and a digital pre-distortion (DPD) circuit, the DPD circuit providing an output coupleable to one or more power amplifier circuits.

FIG. 2A illustrates generally at least a portion of an electronic system 200A, such as including a receiver circuit 104, and a digital pre-distortion (DPD) circuit 102, the DPD circuit providing an output, "x," coupleable to one or more power amplifier circuits. The system 200A can be similar to the example of the system 100, such as having an input 108 configured to be provided with a signal to be transmitted, where the DPD circuit 102 digitally applies a pre-distortion signal to provide a digitally pre-distorted output x. The output x can be digital, and can be converted to the analog domain using a digital-to-analog converter circuit 110, and can be up-converted using a mixer 112 as in the example of FIG. 1. The up-converted output providing a commonly-shared pre-distorted transmission signal can be coupled to a beam-forming circuit 114, to provide individualized weighted, beam-formed inputs to power amplifier circuit 116A, 116B, through 116B.

In the example of FIG. 2A, a spatially-aggregated representation such as a beam 220 formed by an array or sub-array of antennas, including antennas 118A, 118B, through 118M can be received using the receiver circuit 104. The receiver circuit can be included locally as a portion of the system 200A, or the receiver circuit 104 can be located remotely. For example, the receiver circuit 104 can be included as a portion of a hand-held device, a portable device, or a permanently-installed station, such as located externally to or within a structure. The receiver circuit can include or can be coupled to one or more antennas, such as to receive an aggregated representation of power amplifier 116A, 116B, through 116M outputs (e.g., a spatially-aggregated output comprising a superposition of respective antenna-coupled power amplifier outputs). For example, the receiver circuit can be arranged (or the beam-forming adjusted) so that the receiver circuit 104 monitors a signal obtained along a dominant radiation axis 225 of the beam 220 (e.g., along a "boresight" axis). Such an axis can be described as oriented along a direction where a superposition of outputs from the antenna elements results in a greater intensity or gain, as compared to other directions.

The system 200A can be configured to perform adaptation of the digital pre-distortion applied to an input signal, "w," to be transmitted. The adaptation block 224 can invert the received representation of the spatially aggregated signal from the receiver circuit 104, and can monitor the output x of the DPD circuit to modify the pre-distortion, such as to maintain one or more specified output parameters within a specified range. For example, a third-order intermodulation parameter (IMR3) at a specified field point can be maintained at or below a specified value (as shown illustratively in FIG. 4B).

The adaptation performed by the adaptation block 224 can implemented using an application-specific integrated circuit (ASIC), a programmable logic device (PLD) or other programmable device such as field-programmable gate array (FPGA), or such adaptation can be performed in whole or in part using a processor circuit 226 coupled to a memory circuit 228. Other digital operations of the system 200A (or other examples described herein) can similarly be performed using one or more of an ASIC, FPGA, or processor circuit, as illustrative examples.

Figure 2B:
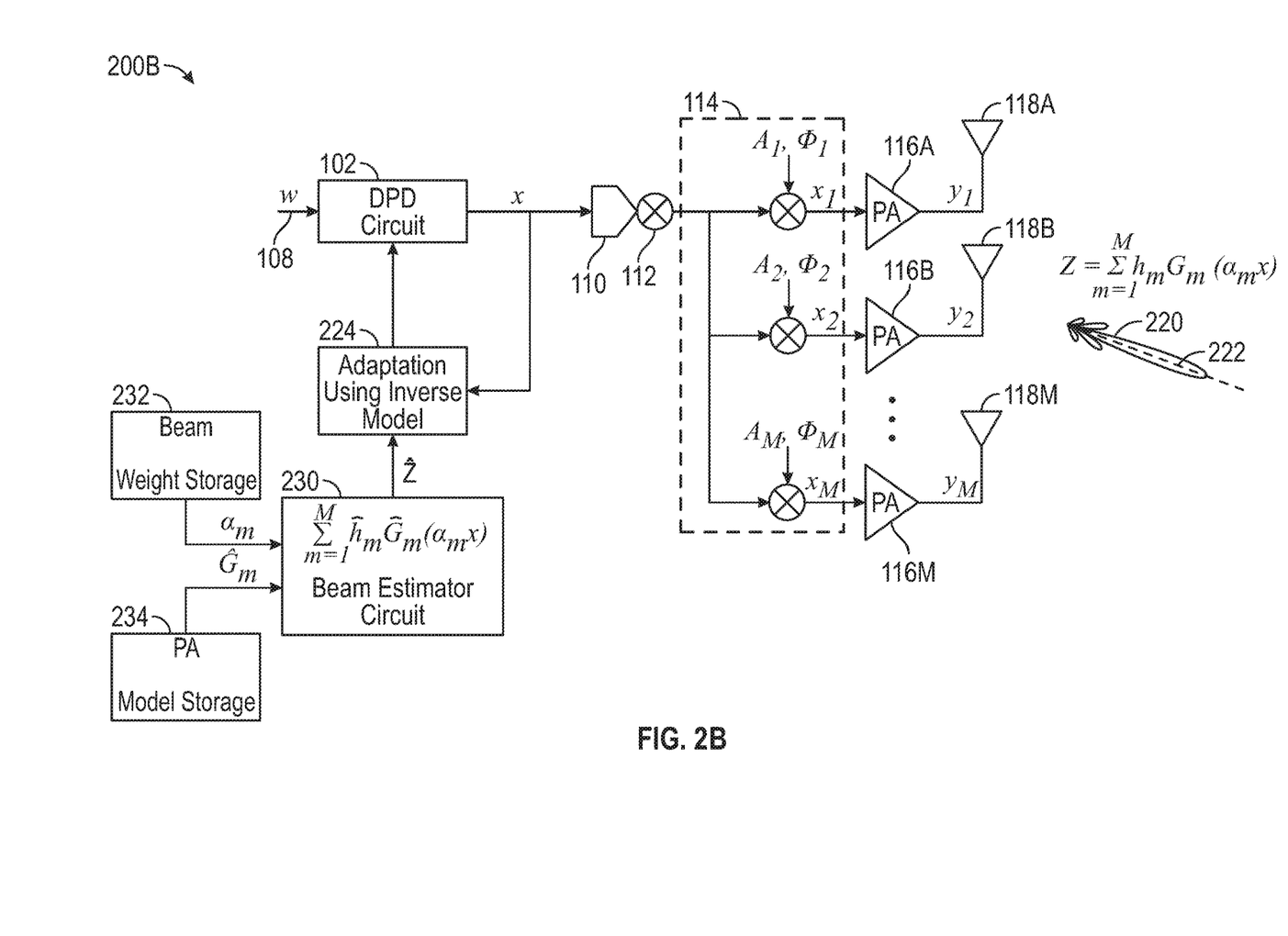
FIG. 2B illustrates generally at least a portion of an electronic system, such as including an estimator circuit, and a digital pre-distortion (DPD) circuit, the DPD circuit providing an output coupleable to one or more power amplifier circuits.

In addition to, or instead of, detection of the spatially-aggregated representation using the receiver circuit 104, an estimate of the aggregated output of the antenna array can be used to provide an adaptively-controlled pre-distortion scheme. For example, FIG. 2B illustrates generally at least a portion of an electronic system 200B, such as including an estimator circuit, and a digital pre-distortion (DPD) circuit 102, the DPD circuit providing an output coupleable to one or more power amplifier circuits. Generally, the system 200B can include elements similar to the examples of FIG. 1 and FIG. 2A, such as the DPD circuit 102, an digital-to-analog converter (DAC) circuit 110, a mixer 112, a beam-forming circuit 114, respective power amplifier (PA) circuits 116A, 116B, through 116B, coupled to respective antenna elements 118A, 118B, through 118M. In the example of FIG. 2B, a signal along a dominant axis 222 of the beam 220 established by the antenna elements 118A, 118B, through 118B can be represented by the following equation:

$$z = \sum_{m=1}^{M} h_m G_m(\alpha_m x) \qquad \text{EQN. 1}$$

In EQN. 1, above, the spatially-aggregated output, "z," can be a sum of respective PA circuit nonlinearities, "$G_m$," represented as a function of a respective beam weighting coefficients, "$\alpha_m$," acting upon the pre-distorted transmission signal, "x," multiplied by a propagation factor, "$h_m$." The system 200B can include an estimator circuit 230, such as defining a non-linear model. The non-linear model can have a form similar to EQN. 1, such as represented by:

$$\hat{z} = \sum_{m=1}^{M} \hat{h}_m \hat{G}_m(\alpha_m x) \qquad \text{EQN. 2.}$$

In EQN. 2, a non-linear model, $\hat{G}_m(\alpha_m x)$, can be used, such as unique to each PA circuit. The non-linear model can be extracted such as in an off-line manner from prior observations. For example, $\hat{G}_m$ values corresponding to respective ones of the PA circuits 116A, 116B, through 116M can be determined such a one-at-a-time by cycling or switching through each PA circuit, such as to provide a $\hat{G}_m$ value corresponding to a particular duration where the PA circuit is stabilized with respect to temperature and has settled. The non-linear model can be stored locally or remotely in a model storage circuit 234, such as comprising a memory circuit. Similarly, respective beam weights can be stored in a beam weight storage circuit 232, such as defining respective beam weighting coefficients, "$\alpha_m$." A propagation model can be extracted from such beam weights, such as to obtain phase shift or other values $\hat{h}_m = \alpha_m^{-1}$, because the beam weights are generally known, such as based upon array steering control. The non-linear model, "$\hat{z}$," can be provided to an adaptation block 224, such as to control the DPD circuit 102, such as by inverting the model, "$\hat{z}$," and applying the inverted model to the pre-distorted output, "x," and comparing the resulting information to the non-pre-distorted message signal, "w." In this manner, the PA circuits 116A, 116B, through 116M are collectively linearized using a commonly-shared pre-distorted output, "x" of the DPD circuit 102. In an example, a blend of sensed information representative of the transmitted beam 220 and an estimated representation, "$\hat{z}$," can be used to adaptively control the DPD circuit 102. While the examples described herein, such as above in relation to FIG. 2A and FIG. 2B refer to collectively linearizing PA circuits 116A, 116B, through 116M, a subset of such PA circuits could be linearized. For example, the antenna elements 118A, 118B, through 118M may be included as a portion of a larger count of antenna elements in a larger array, and groups of PA circuits corresponding to certain sub-groups of antenna elements can be linearized in clusters. As an illustrative example, in an array of 512 PA circuits, 8 sub-groups can be defined, such as each having a system 200A or 200B (or a combination) linearizing a sub-group defining 64 PA circuits amongst the 512 PA circuits. Other forms of partitioning can also be used, such as defining a group of PA circuits to be linearized based on whether such PA circuits contribute to radiation at a particular field point or along a particular radiation axis. In this manner, PA circuits that do not contribute (or whose non-linearity does not impact the resulting beam) can be neglected from the collective linearization for such a mode.

Figure 3:
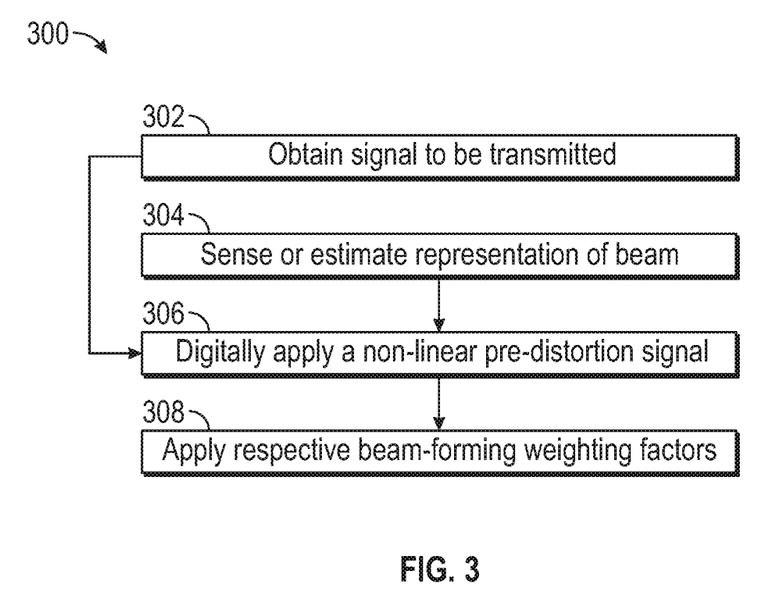
FIG. 3 illustrates generally at technique, such as a method, that can include digitally applying a non-linear pre-distortion signal to the signal to be transmitted, and applying respective beam-forming weighting factors to a pre-distorted transmission signal.

FIG. 3 illustrates generally at technique 300, such as a method, that can include obtaining a signal to be transmitted at 302, digitally applying a non-linear pre-distortion signal to the signal to be transmitted at 306, and applying respective beam-forming weighting factors to a pre-distorted transmission signal at 308. At 304, at least one of sensing or estimating a representation of the beam can be performed, such as to adaptively control the pre-distortion signal applied at 306. Obtaining the signal to be transmitted can include obtaining (such as from a memory location, a digital bus, or digital interface) a digital representation of a non-beam-formed transmission signal, such as corresponding to the input, "w" shown in FIG. 1, FIG. 2A, and FIG. 2B, and such as having a power spectral density (PSD) as shown in the transmission signal 402 of FIG. 4A, described below.

Figure 4A:
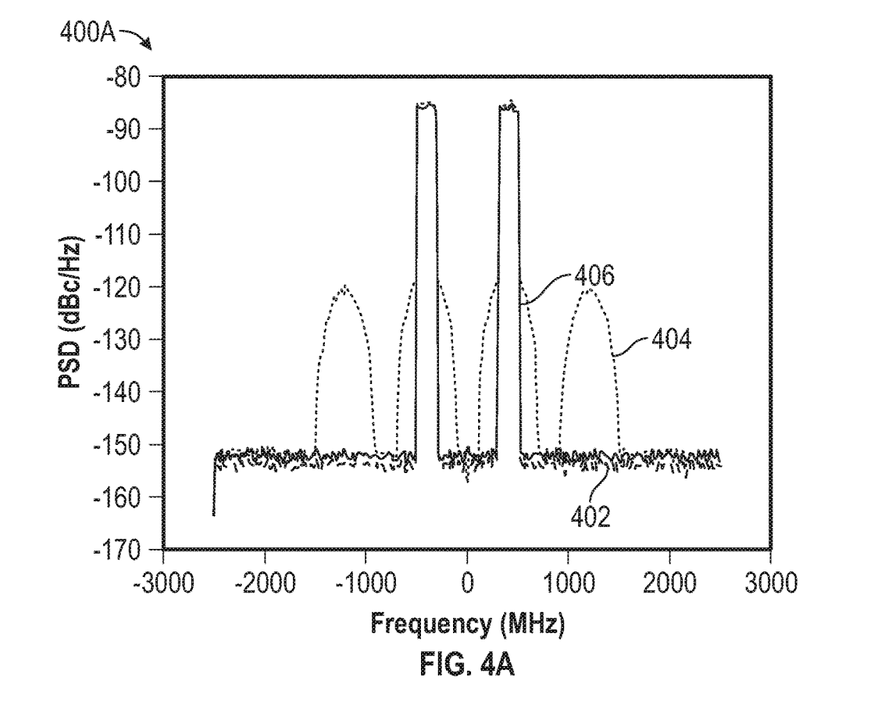
FIG. 4A includes illustrative examples of simulated plots of power-spectral density (PSD) corresponding to a signal to be transmitted by two power amplifier circuits through separate antennas, and resulting signals as would be measured at a specified field point when the transmitted outputs of the power amplifier circuit are spatially aggregated, showing an example having digital pre-distortion applied, and an example lacking digital pre-distortion where third-order non-linearity may cause significant distortion.

FIG. 4A includes illustrative examples of simulated plots of power-spectral density (PSD) corresponding to a signal to be transmitted by two power amplifier circuits through separate antennas, and resulting signals as would be measured at a specified field point when the transmitted outputs of the power amplifier circuit are spatially aggregated, showing an example having digital pre-distortion applied, and an example lacking digital pre-distortion where third-order non-linearity may cause significant distortion. In the illustration of FIG. 4A, a distortion-free representation of the transmission signal 402 spectrum is shown, along with an overlaid representation of a resulting uncorrected transmitted signal 404 in the absence of pre-distortion to correct non-linearity, and a digitally-pre-distorted transmitted signal 406. The simulation of FIG. 4A represents two 200-MHz.-wide orthogonal frequency division multiplexed (OFDM) channels, centered at plus and minus 400 MHz relative to the center frequency. The uncorrected transmitted signal 404 is dominated by third-order distortion (as indicated by the side lobes, which are absent from the transmission signal 406 and the pre-distorted transmitted signal 406. A corresponding spatial dependence on third-order intermodulation relative to the center frequency is shown in FIG. 4B.

Figure 4B:
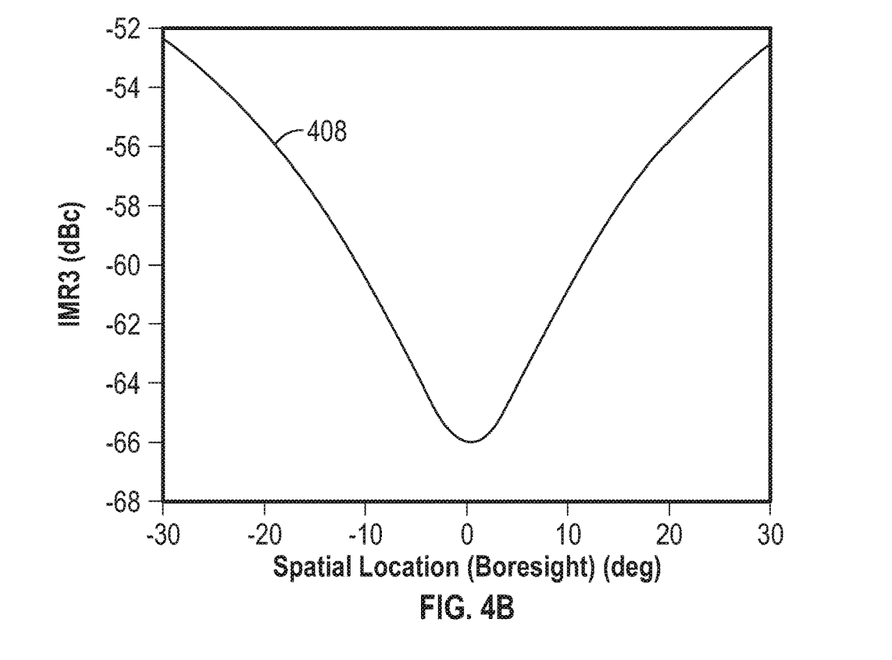
FIG. 4B includes an illustrative example of a simulated dependence of a third order intermodulation distortion parameter (IMR3) on spatial location of a field point as the field point is moved off a dominant radiation (e.g., "boresight") axis.

FIG. 4B includes an illustrative example of a simulated dependence of a third order intermodulation distortion parameter (IMR3) 408 on spatial location of a field point as the field point is moved off a dominant radiation (e.g., "boresight") axis. The simulation parameters used for FIG. 4B are similar to FIG. 4A, and the plot FIG. 4B was generated using a digitally-pre-distorted transmission signal. Generally, as the observer moves off-axis (as shown in degrees on the horizontal axis of FIG. 4B), the effectiveness of the collective linearization techniques described herein can diminish, but such linearization is highly effective on-axis (shown by the minimum in IMR3 at a zero-degree spatial offset).

VARIOUS NOTES

Each of the non-limiting aspects described herein can stand on its own, or can be combined in various permutations or combinations with one or more of the other examples. The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A method for compensating for power amplifier circuit non-linearity in a beam-forming communication transmitter having two or more power amplifier circuits, the method comprising:
generating a non-linear pre-distortion signal based on a combination of sensing information representing a transmitted beam received from respective transmit antennas driven by the two or more power amplifier circuits, corresponding to radiation in a direction in which an antenna gain is greater in magnitude than other directions, and estimating a representation of the beam based on a function of non-linearity values of the two or more power amplifier circuits;
digitally applying the non-linear pre-distortion signal to a signal to be transmitted to provide a digitally pre-distorted transmission signal; and
applying respective beam-forming weighting factors to the digitally pre-distorted transmission signal to provide input transmission signals for respective ones of the two or more power amplifier circuits, the beam-forming weighting factors corresponding to respective ones of the two or more power amplifier circuits.

2. The method of claim 1, wherein the non-linearity values of the two or more power amplifier circuits are determined one at-a-time by cycling or switching through each of the two or more power amplifier circuits.

3. The method of claim 1, wherein the pre-distortion signal is established at least in part by determining an inverse of the function.

4. The method of claim 1, wherein the two or more power amplifier circuits are included among a plurality of power amplifier circuits in the transmitter, wherein the non-linear pre-distortion signal linearizes a given subset of less than all of the plurality of power amplifier circuits in the transmitter, the given subset including the two or more power amplifier circuits.

5. The method of claim 3, wherein the function comprises a power amplifier circuit non-linearity model determined at least in part by using a representation of received signals transmitted by a power amplifier circuit corresponding to the two or more power amplifier circuits.

6. The method of claim 4, further comprising:
selecting the given subset of power amplifier circuits from the plurality of power amplifier circuits to be linearized based on identifying which of the plurality of power amplifier circuits in the transmitter contribute to radiation at a particular field point or along a particular radiation axis; and
neglecting linearizing other power amplifier circuits in the plurality of power amplifier circuits that do not contribute to the radiation at the particular field point or along the particular radiation axis.

7. The method of claim 1 further comprising converting the digitally pre-distorted transmission signal to an analog representation.

8. A communication circuit for compensating for power amplifier circuit non-linearity in a beam-forming communication transmitter having two or more power amplifier circuits, the communication circuit comprising:
circuitry configured to generate a non-linear pre-distortion signal based on a combination of sensing information representing a transmitted beam received from respective transmit antennas driven by the two or more power amplifier circuits, corresponding to radiation in a direction in which an antenna gain is greater in magnitude than other directions, and estimating a representation of the beam based on a function of non-linearity values of the two or more power amplifier circuits;
a digital pre-distortion circuit configured to digitally apply the non-linear pre-distortion signal to a signal to be transmitted to provide a digitally pre-distorted transmission signal; and
a beam-former circuit configured to modify the digitally pre-distorted transmission signal by applying respective beam-forming weighting factors to the digitally pre-distorted transmission signal to provide input transmission signals for respective ones of the two or more power amplifier circuits, the beam-forming weighting factors corresponding to respective ones of the two or more power amplifier circuits.

9. The communication circuit of claim 8, wherein the non-linearity values of the two or more power amplifier circuits are determined one at-a-time by cycling or switching through each of the two or more power amplifier circuits.

10. The communication circuit of claim 8 further comprising an adaptation circuit communicatively coupled to the digital pre-distortion circuit, the adaptation circuit configured to determine an inverse of the function.

11. The communication circuit of claim 8, wherein the two or more power amplifier circuits are included among a plurality of power amplifier circuits in the transmitter, wherein the non-linear pre-distortion signal linearizes a given subset of less than all of the plurality of power amplifier circuits in the transmitter, the given subset including the two or more power amplifier circuits.

12. The communication circuit of claim 10, wherein the function comprises a power amplifier circuit non-linearity model determined at least in part by using a representation of received signals transmitted by a power amplifier circuit corresponding to the two or more power amplifier circuits.

13. The communication circuit of claim 11, wherein the communication circuit is configured to:
select the given subset of power amplifier circuits from the plurality of power amplifier circuits to be linearized based on identifying which of the plurality of power amplifier circuits in the transmitter contribute to radiation at a particular field point or along a particular radiation axis; and
neglect linearizing other power amplifier circuits in the plurality of power amplifier circuits that do not contribute to the radiation at the particular field point or along the particular radiation axis.

14. The communication circuit of claim 8 further comprising a digital-to-analog converter coupled between the digital pre-distortion circuit and the beam-former circuit, the digital-to-analog converter configured to convert the digitally pre-distorted transmission signal to an analog representation.

15. The communication circuit of claim 8, further comprising the two or more power amplifier circuits.

16. The communication circuit of claim 8, wherein the digital pre-distortion circuit is included as a portion of an integrated circuit comprising a processor circuit and a memory circuit.

17. A communication circuit for compensating for power amplifier circuit non-linearity in a beam-forming communication transmitter having two or more power amplifier circuits, the communication circuit comprising:
two or more power amplifier circuits;
circuitry configured to generate a non-linear pre-distortion signal based on a combination of sensing information representing a transmitted beam received from respective transmit antennas driven by the two or more power amplifier circuits, corresponding to radiation in a direction in which an antenna gain is greater in magnitude than other directions, and estimating a representation of the beam based on a function of non-linearity values of the two or more power amplifier circuits that are determined one at-a-time by cycling or switching through each of the two or more power amplifier circuits;
a digital pre-distortion circuit configured to digitally apply the non-linear pre-distortion signal to a signal to be transmitted to provide a digitally pre-distorted transmission signal; and
a beam-former circuit configured to modify the digitally pre-distorted transmission signal by applying respective beam-forming weighting factors to the digitally pre-distorted transmission signal to provide input transmission signals for respective ones of the two or more power amplifier circuits, the beam-forming weighting factors corresponding to respective ones of the two or more power amplifier circuits.

18. The communication circuit of claim 17, comprising an adaptation circuit communicatively coupled to the digital pre-distortion circuit, the adaptation circuit configured to determine an inverse of the function.

19. The communication circuit of claim 17, wherein the two or more power amplifier circuits are included among a plurality of power amplifier circuits in the transmitter, wherein the non-linear pre-distortion signal linearizes a given subset of less than all of the plurality of power amplifier circuits in the transmitter, the given subset including the two or more power amplifier circuits.

20. The communication circuit of claim 19, wherein the communication circuit is configured to:
- select the given subset of power amplifier circuits from the plurality of power amplifier circuits to be linearized based on identifying which of the plurality of power amplifier circuits in the transmitter contribute to radiation along the boresight axis; and
- neglect linearizing other power amplifier circuits in the plurality of power amplifier circuits that do not contribute to the radiation along the boresight axis.

21. A method for compensating for power amplifier circuit non-linearity in a beam-forming communication transmitter having a plurality of power amplifier circuits, the method comprising:
- generating a non-linear pre-distortion signal based on a combination of sensing information representing a transmitted beam received from respective transmit antennas driven by the plurality of power amplifier circuits, corresponding to radiation in a direction in which an antenna gain is greater in magnitude than other directions, and estimating a representation of the beam based on a function of non-linearity values of the plurality of power amplifier circuits;
- digitally compensating a signal to be transmitted using the pre-distortion signal; and
- applying respective beam-forming weighting factors to the digitally compensated signal to provide input transmission signals for respective ones of the plurality of power amplifier circuits, the beam-forming weighting factors corresponding to respective ones of the plurality of power amplifier circuits.

22. A communication circuit for compensating for power amplifier circuit non-linearity in a beam-forming communication transmitter having a plurality of power amplifier circuits, the communication circuit comprising:
- circuitry configured to generate a non-linear pre-distortion signal based on a combination of sensing information representing a transmitted beam received from respective transmit antennas driven by the plurality of power amplifier circuits, corresponding to radiation in a direction in which an antenna gain is greater in magnitude than other directions, and estimating a representation of the beam based on a function of non-linearity values of the plurality of power amplifier circuits;
- a digital compensation circuit configured to digitally compensate a signal to be transmitted using the pre-distortion signal; and
- a beam-former circuit configured to modify the digitally compensated signal by applying respective beam-forming weighting factors to the digitally compensated signal to provide input transmission signals for respective ones of the plurality of power amplifier circuits, the beam-forming weighting factors corresponding to respective ones of the plurality of power amplifier circuits.

23. The method of claim 21, wherein the non-linearity values of the plurality of power amplifier circuits are determined one at-a-time by cycling or switching through each of the plurality of power amplifier circuits.

24. The method of claim 21, wherein the non-linear pre-distortion signal linearizes a given subset of less than all of the plurality of power amplifier circuits in the transmitter.

25. The method of claim 24 further comprising:
- selecting the given subset of the power amplifier circuits to be linearized based on identifying which of the plurality of power amplifier circuits in the transmitter contribute to radiation at a particular field point or along a particular radiation axis; and
- neglecting linearizing other power amplifier circuits in the plurality of power amplifier circuits that do not contribute to the radiation at the particular field point or along the particular radiation axis.

26. The communication circuit of claim 22, wherein the non-linearity values of the plurality of power amplifier circuits are determined one at-a-time by cycling or switching through each of the plurality of power amplifier circuits.

27. The communication circuit of claim 22, wherein the non-linear pre-distortion signal linearizes a given subset of less than all of the plurality of power amplifier circuits in the transmitter.

28. The communication circuit of claim 27, wherein the circuitry is further configured to:
- select the given subset of the power amplifier circuits to be linearized based on identifying which of the plurality of power amplifier circuits in the transmitter contribute to radiation at a particular field point or along a particular radiation axis; and
- neglect linearizing other power amplifier circuits in the plurality of power amplifier circuits that do not contribute to the radiation at the particular field point or along the particular radiation axis.

* * * * *